US012803021B2

(12) United States Patent
Noh et al.

(10) Patent No.: US 12,803,021 B2
(45) Date of Patent: Nov. 17, 2026

(54) ANTIOXIDANT LIQUID FOR FUEL CELL AND METHOD OF CHARGING SAME

(71) Applicants: Hyundai Motor Company, Seoul (KR); Kia Corporation, Seoul (KR)

(72) Inventors: Seung Tak Noh, Yongin-si (KR); Jae Man Park, Yongin-si (KR); Hyun Jae Kim, Seoul (KR); Ji Hoon Sohn, Goyang-si (KR); Seon Yong Lee, Seoul (KR); Seung Hun Kang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 670 days.

(21) Appl. No.: 18/346,652

(22) Filed: Jul. 3, 2023

(65) Prior Publication Data

US 2024/0170699 A1 May 23, 2024

(30) Foreign Application Priority Data

Nov. 17, 2022 (KR) ........................ 10-2022-0154870

(51) Int. Cl.
*H01M 8/04746* (2016.01)
*H01M 8/04223* (2016.01)
*H01M 8/04701* (2016.01)
*H01M 8/04828* (2016.01)
*H01M 8/10* (2016.01)

(52) U.S. Cl.
CPC ... *H01M 8/04746* (2013.01); *H01M 8/04231* (2013.01); *H01M 8/04723* (2013.01); *H01M 8/04828* (2013.01); *H01M 2008/1095* (2013.01)

(58) Field of Classification Search
CPC ............. H01M 4/8663; H01M 4/8807; H01M 8/04082; H01M 8/04231; H01M 8/04302; H01M 8/04358; H01M 8/04365; H01M 8/04492; H01M 8/04723; H01M 8/04746; H01M 8/04828; H01M 8/1051; H01M 2008/1095; H01M 2250/20; Y02E 60/50
See application file for complete search history.

(56) References Cited

U.S. PATENT DOCUMENTS

2009/0233128 A1 9/2009 Ito
2009/0253001 A1 10/2009 Ito
2020/0287230 A1* 9/2020 Lee ...................... H01M 8/1004
2022/0045342 A1* 2/2022 Yu ...................... H01M 8/04589
2022/0200031 A1* 6/2022 Lee ...................... H01M 8/0245

FOREIGN PATENT DOCUMENTS

JP 5205694 B2 6/2013
JP 5233069 B2 7/2013
KR 20210014904 A * 2/2021 ............ C08J 5/2293
KR 20220019865 A 2/2022

* cited by examiner

*Primary Examiner* — Daniel S Gatewood
(74) *Attorney, Agent, or Firm* — Slater Matsil, LLP

(57) ABSTRACT

An embodiment antioxidant liquid for a fuel cell is provided. The antioxidant liquid is to be charged in a gas diffusion layer of a fuel cell stack, and the antioxidant liquid includes a solvent, an oxide as a first antioxidant dispersed in the solvent, and a salt as a second antioxidant dissolved in the solvent.

20 Claims, 5 Drawing Sheets

-PRIOR ART-

-PRIOR ART-

ANTIOXIDANT LIQUID FOR FUEL CELL AND METHOD OF CHARGING SAME

CROSS-REFERENCE TO RELATED APPLICATIONS

This application claims the benefit of Korean Patent Application No. 10-2022-0154870, filed on Nov. 17, 2022, which application is hereby incorporated herein by reference.

TECHNICAL FIELD

The present disclosure relates to an antioxidant liquid for a fuel cell and a method for charging the antioxidant liquid.

BACKGROUND

A fuel cell system is a kind of power generation device that converts the chemical energy of fuel into electrical energy by electrochemical reaction in a stack. Fuel cell systems can be used not only to supply driving power for industrial equipment, home appliances, and vehicles but also to supply power for small electronic products such as portable devices, and their use area is gradually expanding to a high-efficiency clean energy source.

A general fuel cell system includes a fuel cell stack that generates electrical energy, a hydrogen supply system that supplies fuel (hydrogen) to the fuel cell stack, an air supply system that supplies oxygen which originates in the air and serves as an oxidant required for electrochemical reactions to the fuel cell stack, and a heat and water management system that controls the operating temperature of the fuel cell stack.

The fuel cell stack includes a membrane electrode assembly (MEA) that is positioned in the innermost part thereof. The MEA includes a polymer electrolyte membrane allowing a hydrogen cation (proton) to pass therethrough and two catalyst layers disposed on the respective sides of the electrolyte membrane to aid reaction between hydrogen and oxygen. That is, the MEA includes an anode and a cathode.

In addition, two gas diffusion layers (GDLs) are provided as the outermost layers of the MEA. That is, the two GDLs are disposed on the surfaces of the anode and cathode, respectively. Additionally, separating plates having a flow field for supplying fuel and discharging water which is a reaction product are disposed on the outer surfaces of the gas diffusion layers, respectively, and end plates are coupled to the respective separating plates to support and fix all the components described above. Here, the gaskets are formed in various patterns to provide airtight sealing for hydrogen, oxygen (air), and cooling water flowing along the flow fields of the separator.

In the fuel cell stack, a reaction for generating electricity occurs in the membrane electrode assembly. Specifically, hydrogen supplied to the anode (called an oxidation electrode) separates into hydrogen ions (protons) and electrons. The hydrogen ions move toward the cathode (called a reduction electrode) through the electrolyte membrane. The electrons move to the cathode through an external circuit. The hydrogen ions, the electrons, and oxygen molecules react to generate electricity as a target reaction product and water (H2O) as a by-product.

During the reaction for generating electricity in a fuel cell, hydrogen and oxygen originating in the air crossover through the electrolyte membrane to promote the production of hydrogen peroxide (HOOH) which is easily converted into oxygen-containing radicals such as hydroxyl radicals (OH) and hydroperoxyl radicals (OOH) under water-rich conditions.

These radicals attack the perfluorinated sulfonic acid ionomer (PFSA)-based electrolyte membrane, resulting in chemical degradation of the electrolyte membrane and finally deteriorating the durability of the fuel cell.

For this reason, the addition of various types of antioxidants to the electrolyte membrane or electrodes has been proposed to mitigate the chemical degradation of the electrolyte membrane.

As the antioxidant, cerium oxide or cerium salt is commonly used. The cerium oxide or cerium salt produces cerium ions which switch between a trivalent ion and a tetravalent ion and decompose the hydrogen peroxide and the radicals and inhibit the production of hydrogen peroxide and radicals.

When the antioxidant is present in an appropriate amount, it functions to inhibit the production of hydrogen peroxide and radicals. However, when the antioxidant is present in an excessively small or large amount, various problems occur.

FIG. 1A is a view showing a phenomenon when an amount of an antioxidant in a general fuel cell stack is excessive, and FIG. 1B is a view showing a phenomenon when an amount of an antioxidant in a typical fuel cell stack is small.

As shown in FIG. 1A, when the amount of cerium oxide, which is an antioxidant in the fuel cell stack, is excessive, excess cerium oxide 40 present in the microporous layer 21 of the gas diffusion layer 20 is ionized to move to the membrane electrode assembly 10. The moved cerium cations 40*a* are combined with the sulfonic acid group ($SO^{4-}$) of the ionomer of the electrolyte membrane and electrode constituting the membrane electrode assembly 10, thereby deteriorating the ionic conductivity of $H^+$, proton. In addition, since the antioxidant itself is hydrophilic, the antioxidant inhibits the water repellency of the gas diffusion layer 20 and deteriorates the discharging ability of generated water.

Conversely, as shown in FIG. 1B, when the amount of cerium oxide, which is an antioxidant in the fuel cell stack, is small, the amount of cerium oxide 40 gradually decreases as cerium oxide passes through the substrate 22 of the gas diffusion layer 20 along with the generated water generated during the operation of the fuel cell stack and is discharged along the flow path formed in the separation plate 30. In this way, as the amount of cerium oxide 40 is too small and the effect of suppressing the generation of hydrogen peroxide and radicals is insufficient, a problem of accelerating deterioration of the electrolyte membrane constituting the membrane electrode assembly 10 occurs.

Accordingly, research on an effective method for charging an antioxidant and an antioxidant used to maintain the content of the antioxidant in the gas diffusion layer at an appropriate level has been continuously conducted.

The description of the above background art is only for understanding the background of embodiments of the present disclosure and should not be taken as an admission that it corresponds to the prior art already known to those skilled in the art.

SUMMARY

The present disclosure relates to an antioxidant liquid for a fuel cell and a method for charging the antioxidant liquid. Particular embodiments relate to an antioxidant liquid for a fuel cell and a method for charging the antioxidant liquid to maintain an antioxidant component included in a gas diffusion layer of a fuel cell stack at an appropriate level.

Embodiments of the present disclosure provide an antioxidant liquid for a fuel cell and a method for charging the antioxidant liquid for a fuel cell to maintain an antioxidant content in a gas diffusion layer of a fuel cell stack at an appropriate level.

Technical features achievable by embodiments of the present disclosure are not limited to the above-mentioned technical features, and other technical features not mentioned may be clearly understood by those skilled in the art.

An antioxidant liquid for a fuel cell, according to an embodiment of the present disclosure, is charged in a gas diffusion layer of a fuel cell stack, and the antioxidant liquid includes a solvent, an oxide as a first antioxidant dispersed in the solvent, and a salt as a second antioxidant dissolved in the solvent.

In this case, the solvent is water, the first antioxidant is cerium oxide, and the second antioxidant is cerium salt.

The first antioxidant has a particle size D10 of 0.5 μm and D90 of 10 μm.

The first antioxidant and the second antioxidant are contained in the weight ratio range of 120:1 to 600:1.

Meanwhile, a method of charging an antioxidant liquid for a fuel cell, according to an embodiment of the present disclosure, is a method of charging a gas diffusion layer of a fuel cell stack with an antioxidant liquid and includes preparing the antioxidant liquid, determining whether to charge an antioxidant by detecting the state of the fuel cell stack, and charging by supplying the prepared antioxidant liquid to the hydrogen electrode side of the fuel cell stack when it is determined that the antioxidant liquid needs to be charged.

The preparing includes preparing an antioxidant liquid by dispersing an oxide as a first antioxidant in a solvent and dissolving a salt as a second antioxidant.

In the preparing, the solvent is water, the first antioxidant is cerium oxide, and the second antioxidant is cerium salt.

The first antioxidant has a particle size D10 of 0.5 μm and a particle size D90 of 10 μm.

The first antioxidant and the second antioxidant are contained in a weight ratio range of 120:1 to 600:1.

The determining includes determining that charging of the antioxidant is necessary when the inside of the fuel cell stack is determined to be in a high-temperature, low-humidity condition or in a low-temperature, high-humidity condition.

In the determining, when the inside of the fuel cell stack is determined to be in the high-temperature, low-humidity condition, the relative humidity (RH) inside the fuel cell stack is 20% to 40%, and the outflow temperature of the cooling water is 80° C. to 90° C. When the fuel cell stack is determined to be in the low-temperature, high-humidity condition, the relative humidity (RH) inside the fuel cell stack is 50 to 100%, and the outflow temperature of the cooling water is 30 to 50° C.

The charging includes the air electrode side being under the negative pressure while supplying the prepared antioxidant liquid to the hydrogen electrode side of the fuel cell stack.

After the charging, the method further includes purging by supplying the purging liquid to the hydrogen electrode side of the fuel cell stack to discharge the antioxidant liquid remaining in the passage of the separating plate.

The purging liquid is ultrapure water (DI Water).

According to an embodiment of the present disclosure, by dispersing and dissolving the oxide as a first antioxidant having adjusted particle size and a salt as a second antioxidant in an antioxidant liquid at a predetermined weight ratio, even if an antioxidant is supplied only to the hydrogen electrode side, the cerium component that prevents oxidation can be charged to the microporous layer of the hydrogen electrode side gas diffusion layer and the microporous layer of the air electrode side gas diffusion layer with the desired content.

DETAILED DESCRIPTION OF ILLUSTRATIVE EMBODIMENTS

Hereinafter, embodiments disclosed in the present specification will be described in detail with reference to the accompanying drawings, and the same or similar components are assigned the same reference number and a redundant description thereof will be omitted.

The suffixes "module" and "unit" for components used in the following description are given or used together in consideration of ease of writing the specification and do not have meanings or roles that are distinct from each other by themselves.

In describing the embodiments disclosed in this specification, if it is determined that a detailed description of a related known technology may obscure the gist of the embodiments disclosed in this specification, the detailed description thereof will be omitted. Furthermore, the accompanying drawings are intended to facilitate understanding of the embodiments disclosed herein and the embodiments are not limited by the accompanying drawings and should be understood to include all changes, equivalents, or substitutes included in the spirit and scope of this disclosure.

Terms such as "first" and "second" may be used for explaining various constituent elements, but the constituent elements should not be limited to these terms. The above terms are used only for the purpose of distinguishing one component from another.

It will be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present between them.

As used herein, the singular forms "a," "an," and "the" are intended to include the plural forms as well unless the context clearly indicates otherwise.

It will be further understood that the terms "comprises," "includes," or "has" when used in this specification, specify the presence of stated features, regions, integers, steps, operations, elements, and/or components but do not preclude the presence or addition of one or more other features, regions, integers, steps, operations, elements, components, and/or combinations thereof.

Figure 1A:
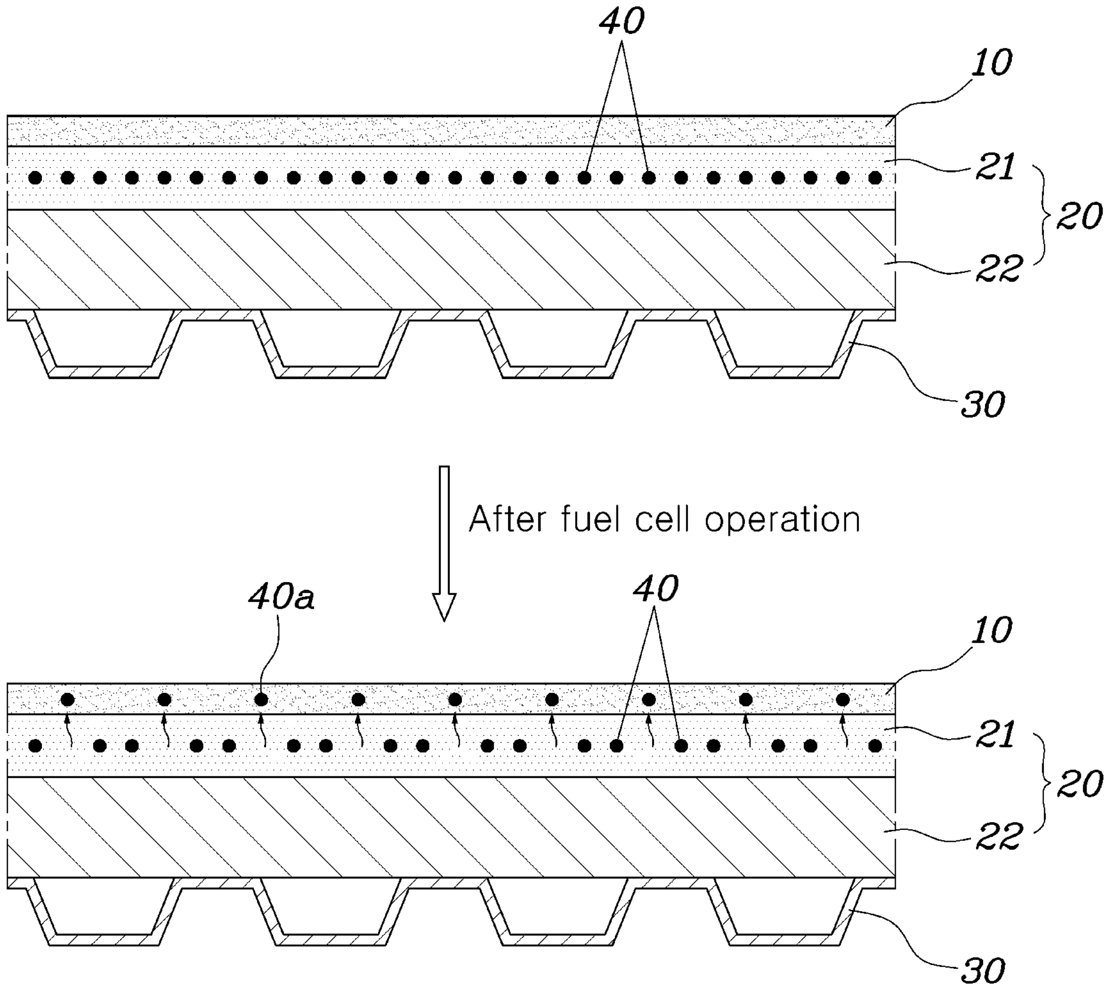
FIG. 1A is a diagram showing a phenomenon when an amount of antioxidant in a general fuel cell stack is excessive.
Figure 1B:
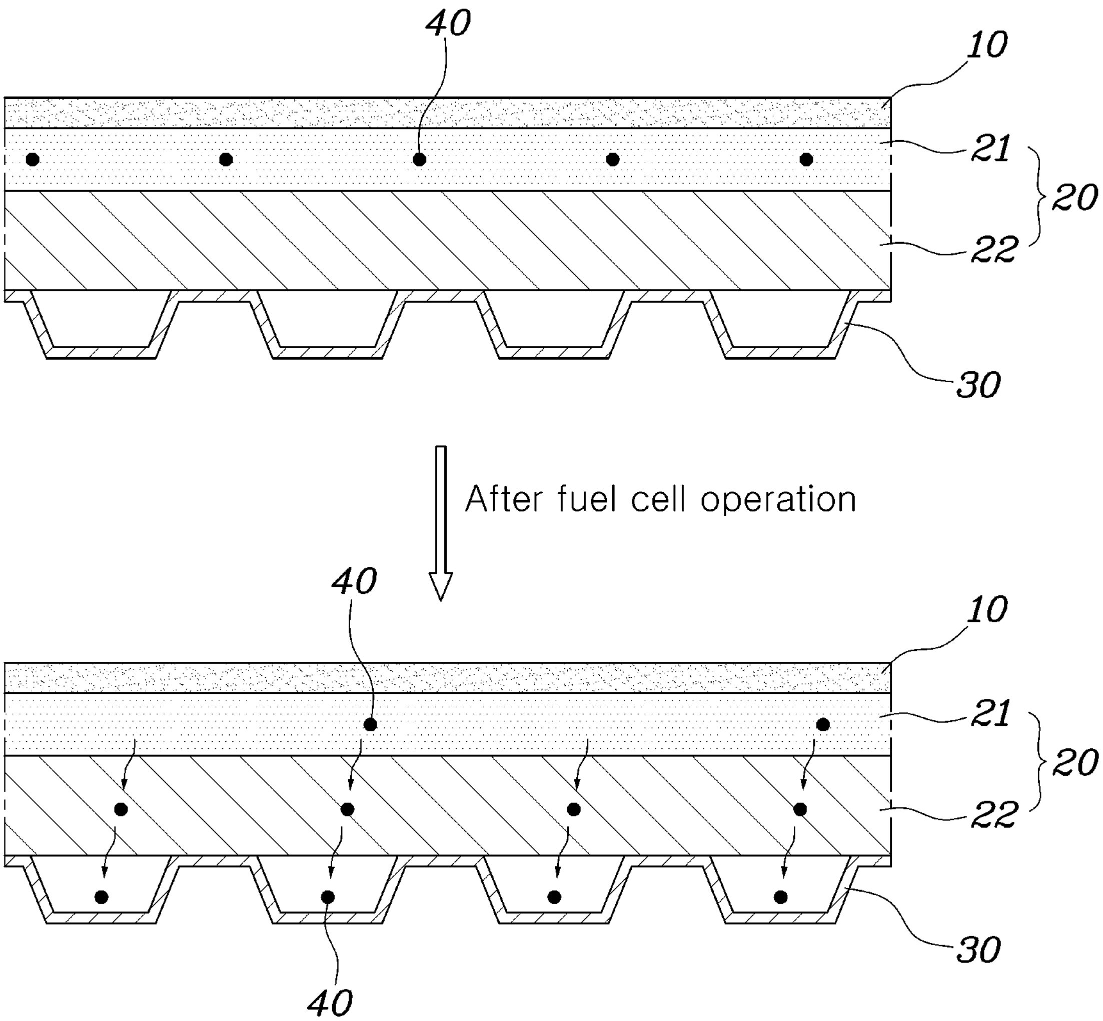
FIG. 1B is a view showing a phenomenon when an amount of antioxidant in a general fuel cell stack is small.
Figure 2:
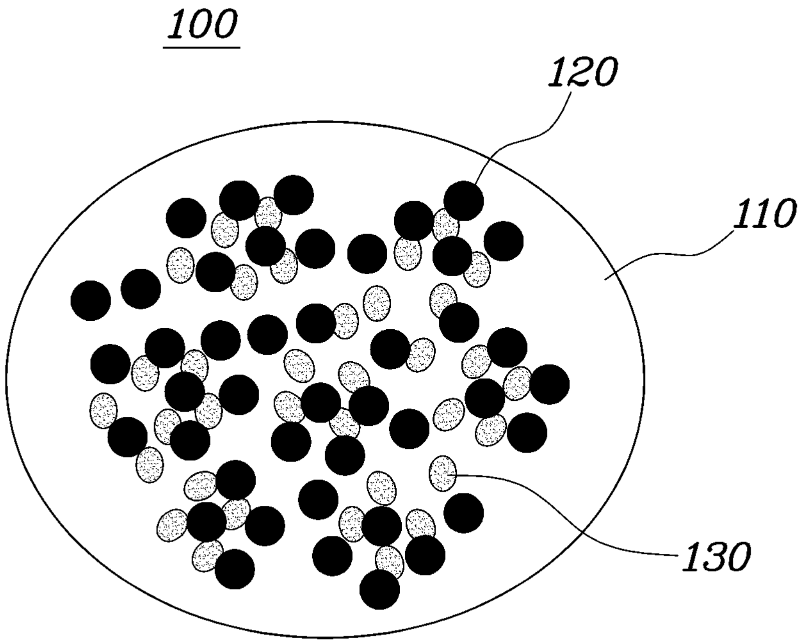
FIG. 2 is a view showing an antioxidant liquid for a fuel cell according to an embodiment of the present disclosure.

FIG. 2 is a view showing an antioxidant liquid for a fuel cell according to an embodiment of the present disclosure.

As shown in FIG. 2, the antioxidant liquid for a fuel cell, according to an embodiment of the present disclosure, is a liquid-phase antioxidant prepared to facilitate the charging of the antioxidant when the gas diffusion layer of the fuel cell stack needs to be charged.

To this end, the antioxidant liquid 100 for a fuel cell, according to an embodiment of the present disclosure, includes a solvent no, an oxide as a first antioxidant 120 dispersed in the solvent no, and a salt as a second antioxidant 130 dissolved in the solvent no.

For example, it is preferable to use water as the solvent no, cerium oxide as the first antioxidant 120, and cerium salt as the second antioxidant 130.

In this way, by dispersing cerium oxide and dissolving cerium salt in water, the antioxidant liquid 100 is formed. When the antioxidant liquid 100 is supplied to the fuel cell stack, even if the fuel cell stack is charged in either direction selected from the hydrogen electrode or the air electrode, both the hydrogen electrode side gas diffusion layer 20*a* and the air electrode side gas diffusion layer 20*b* are charged with the antioxidants 120 and 130 included in the antioxidant liquid.

However, it is preferable to supply the antioxidant liquid 100 prepared according to this embodiment to the hydrogen electrode side.

Therefore, when the antioxidant liquid 100 is supplied in the direction of the hydrogen electrode, cerium oxide in the oxide form is charged while remaining in the hydrogen electrode side gas diffusion layer 20*a*, and cerium salt is ionized and passes through the gas diffusion layer 20*a* and the membrane electrode assembly 10 on the hydrogen electrode side, and then is charged into the gas diffusion layer 20*b* on the air electrode side.

To this end, it is desirable to set the particle size of cerium oxide, the first antioxidant 120 contained in the antioxidant liquid 100, to be smaller than the pores formed in the substrate 21*a* constituting the gas diffusion layer 20*a* and to be larger than the pores formed in the hydrogen electrode constituting the membrane electrode assembly 10.

For example, the particle size of cerium oxide, which is the first antioxidant 120 contained in the antioxidant liquid 100, is preferably D10 of 0.5 μm and D90 of 10 μm.

Figure 3:
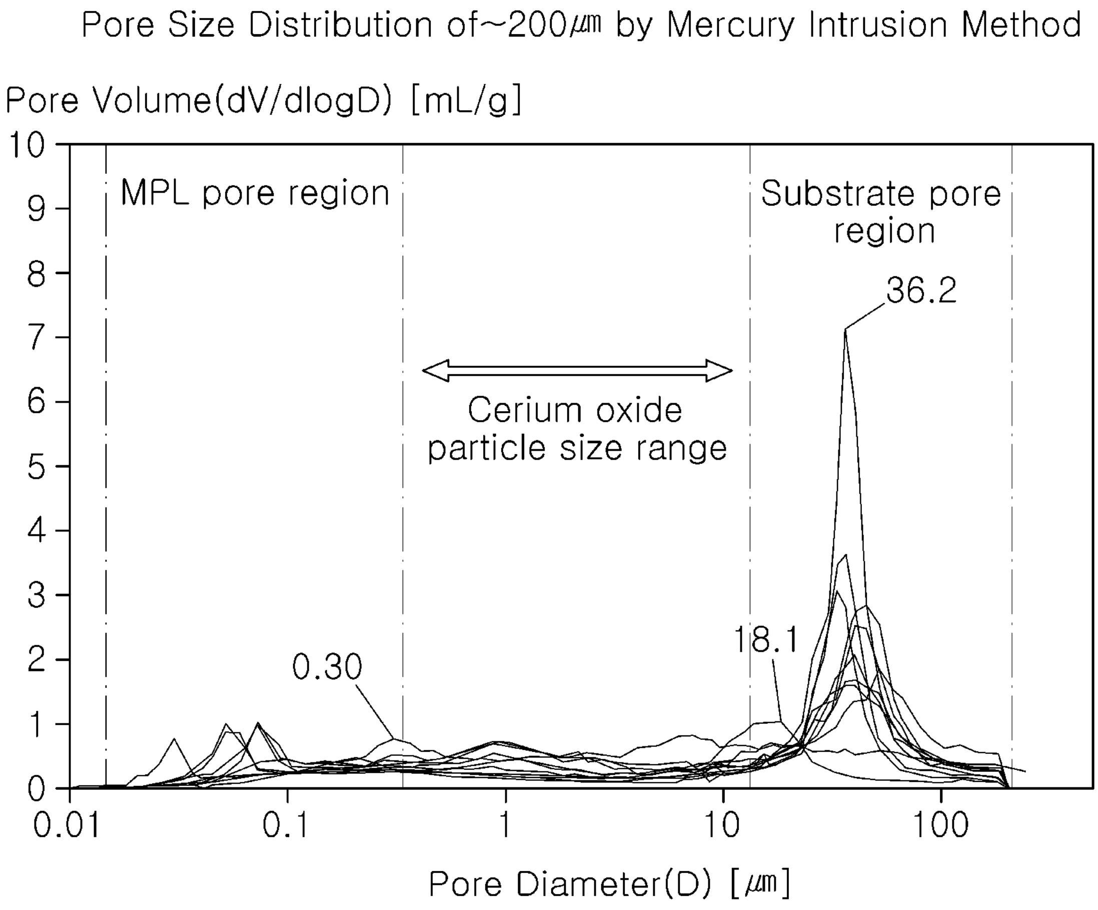
FIG. 3 is a graph showing the size distribution of pores formed in substrates and microporous layers of various types of commercially available gas diffusion layers.

FIG. 3 is a graph showing the size distribution of pores formed in substrates and microporous layers of various types of commercially available gas diffusion layers.

As can be seen from FIG. 3, the pores formed in the micropore layer MPL constituting the gas diffusion layer are generally formed in a size in a range of 0.5 μm or less, and the pores formed in the substrate are generally formed in a size in a range of 10 μm or more.

Therefore, by adjusting the particle size of cerium oxide, which is the first antioxidant 120, to have D10 of 0.5 μm and D90 of 10 μm, among the antioxidants supplied to the hydrogen electrode side gas diffusion layer 20*a*, cerium oxide, which is the first antioxidant 120, is charged while remaining in the micropore layer 22*a* without passing through the substrate.

This is because only when the cerium oxide is positioned in the microporous layer 22*a* the cerium oxide is ionized in a weak acid atmosphere and thus may serve as a radical scavenger in the electrolyte membrane and electrode layers of the adjacent membrane electrode assembly 10.

If the particle size of the cerium oxide is larger than the pore size of the substrate 21*a*, the cerium oxide of the antioxidant liquid 100 is positioned on the substrate 21*a* and cannot function as an antioxidant.

In addition, if the particle size of the cerium oxide is smaller than the pore size of the microporous layer 22*a*, the cerium oxide in the antioxidant liquid 100 is positioned in the membrane electrode assembly 10, so that the membrane electrode assembly 10 is combined with the sulfonic acid group ($SO^{4-}$) of the ionomer of the electrolyte membrane and electrode layer to deteriorate the ionic conductivity of $H^+$, proton.

Then, the contents of the first antioxidant 120 and the second antioxidant 130 included in the antioxidant liquid 100 according to the present embodiment are set.

For example, the first antioxidant 120 and the second antioxidant 130 preferably are contained in a weight ratio range of 120:1 to 600:1.

The reason why the content of cerium salt, which is the second antioxidant 130, is reduced compared to cerium oxide, which is the first antioxidant 120, is that when the cerium component is excessively present on the air electrode side, the hydrophilicity of the gas diffusion layer 20*b* on the air electrode side increases, causing flooding of generated water.

In other words, cerium oxide ($CeO_2$) and cerium salt ($Ce(NO_3)_3$) are ionized into tetravalent ions and trivalent ions, as shown in Formula 1 and Formula 2 below.

$$\text{Cerium oxide: } CeO_2+2H_2O \leftrightarrow Ce^{4+}+4OH^- \quad \text{Formula 1:}$$

$$\text{Cerium salt: } Ce(NO_3)_3 \leftrightarrow Ce^{3+}+3NO^{3-} \quad \text{Formula 2:}$$

The cerium ions ionized into tetravalent and trivalent ions react, as shown in Table 1 below to suppress radicals.

TABLE 1

| Reaction formula | Reaction rate [$M^{-1}s^{-1}$] |
|---|---|
| $Ce^{3+} + \bullet OH + H^+ \rightarrow Ce^{4+} + H_2O$ | $3 \times 10^8$ |
| $Ce^{3+} + \bullet OOH + H^+ \rightarrow Ce^{4+} + H_2O_2$ | $2.1 \times 10^5$ |
| $Ce^{4+} + H_2O_2 \rightarrow Ce^{3+} + \bullet OOH + H^+$ | $10^6$ |
| $Ce^{4+} + \bullet OOH \rightarrow Ce^{3+} + O_2 + H^+$ | $2.7 \times 10^6$ |

As shown in Table 1 above, the radical suppression reaction rate of $Ce^{3+}$ is about 300 times faster than that of $Ce^{4+}$.

Therefore, it is preferable to set the weight ratio of the cerium oxide and the cerium salt contained in the antioxidant liquid 100 in consideration of the radical suppression reaction rate of $Ce^{4+}$ and $Ce^{3+}$.

In other words, the molecular weight of cerium oxide and cerium salt is 172.115 g/mol for $CeO_2$ and 434.22 g/mol for $Ce(NO_3)_3 \cdot 6H_2O$.

Therefore, since the weight ratio of cerium oxide and cerium salt is about 120:1, the maximum weight ratio of cerium oxide and cerium salt is preferably limited to 120:1.

In addition, when the content of cerium in the hydrogen electrode is insufficient compared to the content of cerium in the air electrode, the effect of durability improvement is reduced, and thus it is desirable to limit the minimum weight ratio of cerium oxide and cerium salt.

For example, the durability improvement effect tends to decrease when the content of cerium present on the hydrogen electrode side and the air electrode side is 5:1 or less based on the weight of $Ce^{4+}$. If the content ratio is multiplied by 120 in consideration of the reaction rate of $Ce^{3+}$, it is desirable that the minimum weight ratio of the cerium oxide and the cerium salt is limited to 600:1.

Therefore, among the components constituting the antioxidant liquid 100, the weight ratio of the first antioxidant 120, which is cerium oxide remaining in the gas diffusion layer 20*a* on the hydrogen electrode side, and the second antioxidant 130, which is a cerium salt moved to the gas diffusion layer 20*b* on the air electrode side, is preferably limited to 120:1 to 600:1.

On the other hand, the reason why the antioxidant liquid 100 prepared according to this embodiment is supplied to the hydrogen electrode side is that the cerium salt is ionized to $Ce^{3+}$, which can reduce the conductivity of the fuel cell by occupying the conductive site of the sulfonic acid group ($SO^{3-}$) of the electrode layer of the membrane electrode assembly 10 and the electrolyte membrane, and which can cause a side effect of degrading the side chain of the ionomer because if the cerium salt is directly introduced into the air electrode side, excess cerium trivalent ions can occupy the sulfonic acid group of the air electrode side and reduce the conductivity of hydrogen ions ($H^+$). In particular, since the*ORR reaction rate of the air electrode is much slower than the*HOR reaction rate of the hydrogen electrode, such deterioration in the conductivity of the ionomer sulfonic acid group may be fatal to the operation of the fuel cell.

Next, a method of charging the prepared antioxidant into the fuel cell stack will be described.

FIG. 3 is a diagram showing a phenomenon during the charging of an antioxidant liquid for a fuel cell according to an embodiment of the present disclosure.

A method of charging an antioxidant liquid for a fuel cell, according to an embodiment of the present disclosure, is a method of charging a gas diffusion layer of a fuel cell stack with an antioxidant liquid including preparing the antioxidant liquid, determining whether to charge an antioxidant by detecting the state of the fuel cell stack, and charging by supplying the prepared antioxidant liquid to the hydrogen electrode side of the fuel cell stack when it is determined that the antioxidant liquid needs to be charged.

The preparation step is preparing the antioxidant liquid 100 as described above.

As described above, the antioxidant liquid 100 prepared in the preparation disperses the oxide as the first antioxidant 120 in the solvent 110 and dissolves the salt as the second antioxidant 130 to prepare the antioxidant liquid.

At this time, water is used as the solvent no, cerium oxide is used as the first antioxidant 120, and cerium salt is used as the second antioxidant 130.

In addition, cerium oxide, which is the first antioxidant 120, is prepared to have a particle size of D10:0.5 μm and D90:10 μm.

In addition, the weight ratio of cerium oxide as the first antioxidant 120 and cerium salt as the second antioxidant 130 is prepared to satisfy 120:1 to 600:1.

Next, the determining is whether to charge the antioxidant liquid 100 by detecting the humidity and temperature state of the fuel cell stack. When the inside of the fuel cell stack is determined to be a high-temperature and low-humidity condition or a low-temperature and high-humidity condition, it is necessary to charge the antioxidant liquid 100.

The reason why the antioxidant liquid 100 is charged in the high-temperature and low-humidity condition or the low-temperature and high-humidity condition inside the fuel cell stack is that degradation of the electrolyte membrane constituting the membrane electrode assembly 10 accelerates when the fuel cell stack is under high-temperature and low-humidity conditions and cerium is discharged by the generated water when the fuel cell stack is under low-temperature and high-humidity conditions.

For example, when the relative humidity (RH) inside the fuel cell stack is 20% to 40%, and the outflow temperature of the coolant is 80° C. to 90° C., it is preferable to determine that the inside of the fuel cell stack is in a high-temperature and low-humidity condition, and when the relative humidity (RH) inside the fuel cell stack is 50% to 100% and the outflow temperature of the cooling water is 30° C. to 50° C., it is preferable to determine that the inside of the fuel cell stack is in a low-temperature, high-humidity condition.

Next, the charging supplies the prepared antioxidant liquid 100 to the hydrogen electrode side of the fuel cell stack and supplies the antioxidant liquid 100 to the fuel cell stack through a hydrogen supply system.

At this time, it is preferable to apply a negative pressure at the air electrode side while supplying the antioxidant liquid 100 to the hydrogen electrode side for a smooth supply of the antioxidant liquid 100.

The reason why the antioxidant liquid 100 is supplied only to the hydrogen electrode side through the hydrogen supply system and negative pressure is applied on the air electrode side is that the microporous layers 22*a* and 22*b* constituting the gas diffusion layers 20*a* and 20*b* have a high water repellency with a contact angle of 150 degrees, and when the antioxidant liquid 100 is simultaneously supplied to the hydrogen electrode side and the air electrode side, the antioxidant liquid 100 cannot pass through the microporous layers 22*a* and 22*b* having high water repellency.

In other words, this is because when the antioxidant liquid 100 is supplied to the hydrogen electrode side and the cathode side at a similar pressure, the antioxidant liquid 100 does not remain in the micropore layers 22*a* and 22*b* with high water repellency, and the antioxidant is discharged.

Next, after the charging, a purging by discharging the antioxidant remaining in the flow path of the separation plate 30*a* by supplying the purging liquid to the hydrogen electrode side of the fuel cell stack may be further included.

When the antioxidant liquid 100 supplied to the hydrogen electrode side through the hydrogen supply system remains in the flow path of the separating plate 30*a*, a smooth hydrogen supply is hindered during the operation of the fuel cell, and excessive cerium component is supplied. Therefore, it is important to discharge the antioxidant liquid 100 remaining in the flow path of the separating plate 30*a* when the charging of the antioxidant liquid 100 is completed.

At this time, ultrapure water (DI Water) is used as the purging liquid while preventing a bad influence on the components constituting the fuel cell stack to allow the antioxidant liquid 100 in a liquid state to be diluted and discharged smoothly.

Next, a phenomenon in which cerium components are charged in the hydrogen electrode side gas diffusion layer and the cathode-side gas diffusion layer during the charging of the antioxidant liquid for the fuel cell will be described with reference to the drawings.

Figure 4:
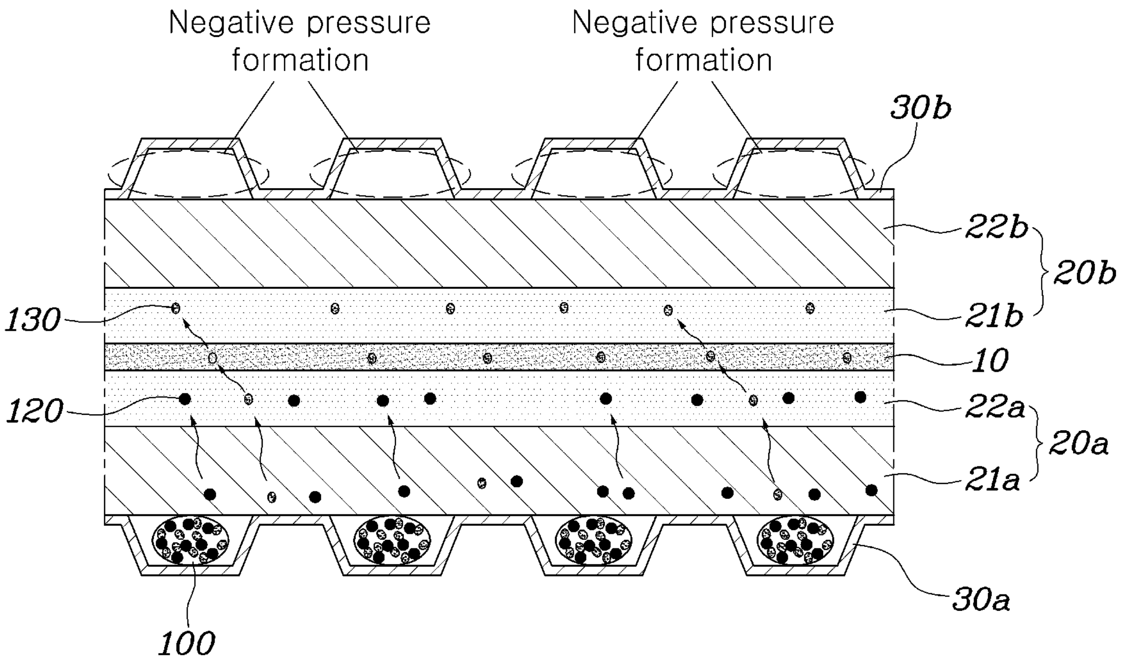
FIG. 4 is a diagram showing a phenomenon during the charging of an antioxidant liquid for a fuel cell according to an embodiment of the present disclosure.

FIG. 4 is a diagram showing a phenomenon during the charging of an antioxidant liquid for a fuel cell according to an embodiment of the present disclosure.

As shown in FIG. 4, while the antioxidant liquid 100 is supplied through the passage formed in the hydrogen electrode side separation plate 30*a*, the air electrode side region is under the negative pressure.

Then, due to the pressure difference between the hydrogen electrode side region and the air electrode side region, cerium oxide, which is the first antioxidant 120, and cerium salt, which is the second antioxidant 130, are transferred to the hydrogen electrode side gas diffusion layer 20*a*.

At this time, the cerium oxide, which is the first antioxidant 120 whose particle size is adjusted, passes through the substrate Zia constituting the hydrogen electrode side gas diffusion layer 20*a*, but the cerium oxide does not pass through the micropore layer 22*a* constituting the hydrogen electrode side gas diffusion layer 20*a*, so the cerium oxide remains and is charged in the micropore layer 22*a* forming the hydrogen electrode side gas diffusion layer 20*a* and is charged without passing through the micropore layer 22*a*.

On the other hand, since the cerium salt, which is the second antioxidant 130 contained in the antioxidant liquid 100, is in an ionized state, the cerium salt passes through the substrate Zia and the microporous layer 22*a* constituting the hydrogen electrode side gas diffusion layer 20*a* and is charged while remaining in the micropore layer 22*b* forming the air electrode side gas diffusion layer 20*b*.

In this way, by dispersing the oxide as the first antioxidant 120 and dissolving the salt as the second antioxidant 130 in a predetermined weight ratio in the antioxidant liquid 100, even if the antioxidant liquid 100 is supplied only to the hydrogen electrode side, the cerium component that acts as oxidation prevention can be charged with the desired content to the micropore layer 22*a* of the hydrogen electrode side gas diffusion layer 20*a* and the micropore layer 22*b* of the air electrode side gas diffusion layer 20*b*.

Although embodiments of the present disclosure have been described with reference to the accompanying drawings and preferred embodiments described above, the present disclosure is not limited thereto but is limited by the claims described below. Therefore, those skilled in the art can variously change and modify the present disclosure within the scope, not departing from the technical spirit of the claims described below.

What is claimed is:

1. A method of charging an antioxidant liquid for a fuel cell in a gas diffusion layer, the method comprising:
- preparing the antioxidant liquid;
- detecting a state of a fuel cell stack to determine that it is necessary to charge the antioxidant liquid; and
- supplying the antioxidant liquid to a hydrogen electrode of the fuel cell stack in response to a determination that it is necessary to charge the antioxidant liquid, wherein an air electrode is under a negative pressure while the antioxidant liquid is supplied to the hydrogen electrode.

2. A method of charging an antioxidant liquid for a fuel cell in a gas diffusion layer, the method comprising:
- preparing the antioxidant liquid by dispersing a first antioxidant having an oxide form in a solvent and dissolving a second antioxidant having a salt form in the solvent;
- detecting a state of a fuel cell stack to determine that it is necessary to charge the antioxidant liquid; and
- supplying the antioxidant liquid to a hydrogen electrode of the fuel cell stack in response to a determination that it is necessary to charge the antioxidant liquid.

3. The method of claim 2, wherein the solvent comprises water, the first antioxidant comprises a cerium oxide, and the second antioxidant comprises a cerium salt.

4. The method of claim 2, wherein the first antioxidant has a D10 particle size of 0.5 μm and a D90 particle size of 10 μm.

5. The method of claim 2, wherein the first antioxidant and the second antioxidant are contained in a weight ratio range of 120:1 to 600:1.

6. A method of charging an antioxidant liquid for a fuel cell in a gas diffusion layer, the method comprising:
- preparing the antioxidant liquid;
- detecting a state of a fuel cell stack to determine that it is necessary to charge the antioxidant liquid in response to determining that an inside of the fuel cell stack is in a high-temperature low-humidity condition or a low-temperature high-humidity condition; and
- supplying the antioxidant liquid to a hydrogen electrode of the fuel cell stack in response to a determination that it is necessary to charge the antioxidant liquid.

7. The method of claim 6, wherein the high-temperature low-humidity condition is a condition in which a relative humidity inside the fuel cell stack is in a range of 20% to 40% and an outflow temperature of a cooling water is in a range of 80° C. to 90° C.; and
- wherein the low-temperature high-humidity condition is a condition in which a relative humidity inside the fuel cell stack is in a range of 50% to 100% and an outflow temperature of cooling water is in a range of 30° C. to 50° C.

8. The method of claim 1, wherein the determination that it is necessary to charge the antioxidant liquid is made in response to determining that an inside of the fuel cell stack is in a condition in which a relative humidity inside the fuel cell stack is in a range of 20% to 40% and an outflow temperature of a cooling water is in a range of 80° C. to 90° C.

9. The method of claim 1, wherein the determination that it is necessary to charge the antioxidant liquid is made in response to determining that an inside of the fuel cell stack is in a condition in which a relative humidity inside the fuel cell stack is in a range of 50% to 100% and an outflow temperature of cooling water is in a range of 30° C. to 50° C.

10. The method of claim 1, further comprising purging the antioxidant liquid remaining in a flow field of a separating plate by supplying a purging liquid to the hydrogen electrode of the fuel cell stack.

11. The method of claim 10, wherein the purging liquid comprises ultrapure water (DI water).

12. The method of claim 2, wherein the determination that it is necessary to charge the antioxidant liquid is made in response to determining that an inside of the fuel cell stack is in a condition in which a relative humidity inside the fuel cell stack is in a range of 20% to 40% and an outflow temperature of a cooling water is in a range of 80° C. to 90° C.

13. The method of claim 2, wherein the determination that it is necessary to charge the antioxidant liquid is made in response to determining that an inside of the fuel cell stack is in a condition in which a relative humidity inside the fuel cell stack is in a range of 50% to 100% and an outflow temperature of cooling water is in a range of 30° C. to 50° C.

14. The method of claim 2, wherein an air electrode is under a negative pressure while the antioxidant liquid is supplied to the hydrogen electrode.

15. The method of claim 2, further comprising purging the antioxidant liquid remaining in a flow field of a separating plate by supplying a purging liquid to the hydrogen electrode of the fuel cell stack.

16. The method of claim 15, wherein the purging liquid comprises ultrapure water (DI water).

17. The method of claim 6, wherein an air electrode is under a negative pressure while the antioxidant liquid is supplied to the hydrogen electrode.

18. The method of claim 6, further comprising purging the antioxidant liquid remaining in a flow field of a separating plate by supplying a purging liquid to the hydrogen electrode of the fuel cell stack.

19. The method of claim 6, wherein the high-temperature low-humidity condition is a condition in which a relative humidity inside the fuel cell stack is in a range of 20% to 40% and an outflow temperature of a cooling water is in a range of 80° C. to 90° C.

20. The method of claim 6, wherein the low-temperature high-humidity condition is a condition in which a relative humidity inside the fuel cell stack is in a range of 50% to 100% and an outflow temperature of cooling water is in a range of 30° C. to 50° C.

* * * * *